(12) United States Patent
Baehrle-Miller

(10) Patent No.: US 10,293,850 B2
(45) Date of Patent: May 21, 2019

(54) METHOD FOR AUTOMATIC ADJUSTMENT OF THE STEERING ANGLE IN A STEERING SYSTEM OF A VEHICLE

(71) Applicant: Robert Bosch GmbH, Stuttgart (DE)

(72) Inventor: Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 15/220,334

(22) Filed: Jul. 26, 2016

(65) Prior Publication Data

US 2017/0029020 A1  Feb. 2, 2017

(30) Foreign Application Priority Data

Jul. 27, 2015  (DE) .................. 10 2015 214 122

(51) Int. Cl.
*B62D 5/04* (2006.01)
*B62D 15/02* (2006.01)

(52) U.S. Cl.
CPC ....... *B62D 5/0466* (2013.01); *B62D 15/0245* (2013.01); *B62D 15/0285* (2013.01)

(58) Field of Classification Search
CPC .............. B62D 5/0466; B62D 15/0245; B62D 15/0285
See application file for complete search history.

(56) References Cited

U.S. PATENT DOCUMENTS

2009/0243888 A1* 10/2009 Kawabata ............ B62D 15/028 340/932.2
2010/0283632 A1* 11/2010 Kawabata ............ B62D 15/027 340/932.2
2011/0276225 A1* 11/2011 Nefcy .................. B62D 15/027 701/41

FOREIGN PATENT DOCUMENTS

DE  10 2010 001 922 A1  8/2011

* cited by examiner

*Primary Examiner* — Mussa A Shaawat
(74) *Attorney, Agent, or Firm* — Maginot, Moore & Beck LLP

(57) ABSTRACT

A method is used to automatically adjust a steering angle in a steering system of a vehicle. The method includes activating a steering actuator after parking the vehicle such that the steering wheel and the steerable wheels adopt a neutral position.

11 Claims, 1 Drawing Sheet

METHOD FOR AUTOMATIC ADJUSTMENT
OF THE STEERING ANGLE IN A STEERING
SYSTEM OF A VEHICLE

This application claims priority under 35 U.S.C. § 119 to patent application number DE 10 2015 214 122.5, filed on Jul. 27, 2015 in Germany, the disclosure of which is incorporated herein by reference in its entirety.

BACKGROUND

The disclosure concerns a method for the automatic adjustment of the steering angle in a steering system of a vehicle.

A method for turning a steerable wheel of a motor vehicle when parking is described in DE 10 2010 001 922 A1. With said method, the inclination of the vehicle is determined using a sensor and the steering angle is automatically adjusted such that the vehicle cannot roll away. The immediate surroundings of the vehicle are detected by means of sensors on the vehicle and the steering angle is adjusted such that the steerable wheel is directed towards the curb so that said wheel would contact the curb in the event of unintentional rolling away of the motor vehicle.

SUMMARY

With the method according to the disclosure, the steering angle in a steering system of a vehicle can be automatically adjusted after the vehicle has been parked. The steering system is provided with a steering actuator, upon the actuation of which the steering angle is adjusted. The steering angle at the steerable wheels of the vehicle can be influenced accordingly.

The steering angle is adjusted by means of the steering actuator such that the steerable wheels adopt a neutral position in which the wheels are at least approximately oriented parallel to the longitudinal axis of the vehicle. The steerable wheels are thus straight, so that the vehicle drives straight ahead after starting off again if the steering angle is not changed by the driver.

The steering angle is automatically adjusted to the neutral position either immediately following the parking process or before or during a re-start of the vehicle. In any case, the automatic adjustment takes place before driving away from the parked position.

The automatic adjustment of the neutral position in the steering angle has the advantage that in particular untrained or unsure drivers do not experience any unpleasant surprises when starting the vehicle owing to an unexpected change of steering angle. The neutral position of the steering angle corresponds rather to the expected one, so that surprises when driving off from the parked position of the vehicle are avoided. If a steering angle is necessary when driving off, for example when unparking from a parking space, this can be performed by the driver starting from the neutral position of the steering system.

Various options come under consideration for the activation of the steering actuator for adopting the neutral position. With all implementations, however, it is a prerequisite that the vehicle is in the parked position.

According to a first embodiment, the steering actuator is set in motion by manual triggering after completion of the parking process. Accordingly, the steering actuator must be activated by means of an operation by the driver, for example by means of a switch in the vehicle. The manual triggering can either be performed immediately following the completed parking process or before a re-start of the vehicle.

According to a further embodiment, the steering actuator is set in motion automatically following the end of the parking process. For this purpose, a signal is produced in a regulation or control unit in the vehicle that identifies the end of the parking process and that serves as the prerequisite for the activation of the steering actuator. Said procedure has the advantage that activation of the steering actuator for adopting the neutral position is carried out automatically and without the active involvement of the driver.

The signal that indicates the end of the parking process can be produced in various ways. According to one advantageous embodiment, the vehicle is fitted with an automated parking brake that produces a brake force that holds the vehicle stationary. The automated parking brake automatically produces the signal once the target brake force is produced, whereupon the steering actuator of the steering system is automatically activated for adopting the neutral position.

The automated parking brake comprises for example an electric brake motor that presses a brake piston, which is a support for a brake lining, against a brake disk.

The automated parking brake enables the automatic generation of the brake force that holds the vehicle stationary. The parking brake is either triggered automatically, for example once the ignition in the vehicle has been switched off, or by means of an operation by the driver.

In a further embodiment, the vehicle is fitted with a non-automated parking brake, with which the generation of the brake force holding the vehicle stationary is carried out by means of a driver operation. The driver has to operate a brake lever in order to produce the desired brake force for example. A signal indicating the end of the parking process can be produced in this case also, for example on reaching a minimum parking brake force, wherein the signal is used for the activation of the steering actuator for adopting the neutral position.

According to yet another advantageous embodiment, the signal indicating the end of the parking process is produced if the vehicle is at a standstill, and moreover the ignition of the drive engine in the vehicle is set to "off". If both said conditions are met, the signal can be used for activation of the steering actuator for adopting the neutral position. The ignition being off in combination with the ending of the parking process indicates the definite desire of the driver to end the trip, whereupon the neutral position of the steering angle is adopted.

According to yet another advantageous embodiment, the steering actuator is automatically set in motion if the ignition of the drive engine in the vehicle is set from "off" to "on". Said situation usually identifies the driver's wish to start the vehicle, whereupon the neutral position of the steering angle is adopted by the activation of the steering actuator. The advantage of said procedure is that the steering system does not necessarily have to be in the neutral position during the parking process, but may have a steering angle, for example for preventing the vehicle from rolling away. For example, the steering system is activated depending on the gradient of the road and a steering angle is predetermined that is maintained during the parking time. The steering actuator is only activated for adopting the neutral position immediately before the start or possibly simultaneously with starting the vehicle.

In an alternative embodiment concerning the activation of the steering actuator when switching off and parking the vehicle, the steering actuator is set in motion for setting the neutral position regardless of the gradient of the road.

The steering actuator of the steering system is preferably an electric servomotor that supplies a boosting torque into the steering system.

The different steps of the method for automatic adjustment of the steering angle are performed in a regulating or control unit in the vehicle. The regulating or control unit can be a component of a steering system in the vehicle. The vehicle is advantageously fitted with an automated parking brake, preferably with an electric brake motor, and with a steering system with a steering actuator, preferably with an electric servomotor.

BRIEF DESCRIPTION OF THE DRAWINGS

Further advantages and advantageous embodiments are to be found in the following description of the figures and the figures. In the figures.

DETAILED DESCRIPTION

Figure 1:
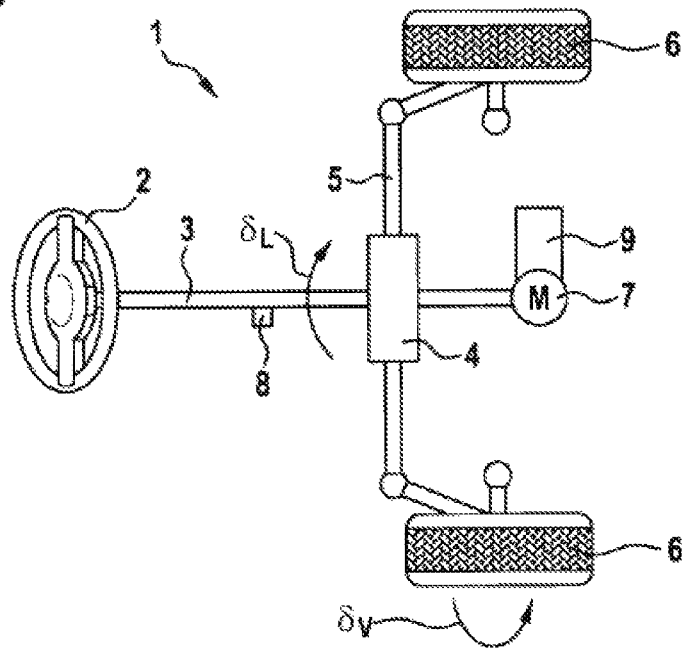
FIG. 1 shows a schematic representation of a steering system in a vehicle with an electric servomotor for power steering as well as for the automatic adjustment of the steering angle.

The steering system 1 in a vehicle represented in FIG. 1 comprises a steering wheel 2, a steering shaft 3, a steering gearbox 4, a steering linkage 5 as well as an electric servomotor 7 for influencing the steering movement of steerable wheels 6. By means of the steering shaft 3 the driver specifies a steering angle $\delta_L$ that is transformed by means of the steering gearbox 4 into a steering movement of a toothed rod of the steering linkage 5, whereupon a wheel steering angle $\delta_V$ is adjusted at the steerable wheels 6. A servo torque or boosting torque can be supplied in the region of the steering gearbox 4 by means of the electric servomotor 7 for power steering. Moreover, the steering system 1 advantageously comprises a steering angle sensor 8, with which the current steering angle $\delta_L$ can be determined.

The electric servomotor 7 may also be activated regardless of the operation of the steering wheel 2 by the driver, in particular in order to set a desired steering angle $\delta_L$ in the steering system independently of the driver.

Moreover, a regulating or control unit 9 is associated with the steering angle 1, by means of the signals of which the electric servomotor 7 is activated. The regulating or control unit 9 processes input signals, in particular sensor signals, for example signals of the steering angle sensor 8 as well as of the further signals of a torque sensor, with which the manual torque generated by the driver and predetermined by means of the steering wheel is detected. The regulating or control unit 9 can also process signals of an environment sensor system of the vehicle.

Figure 2:
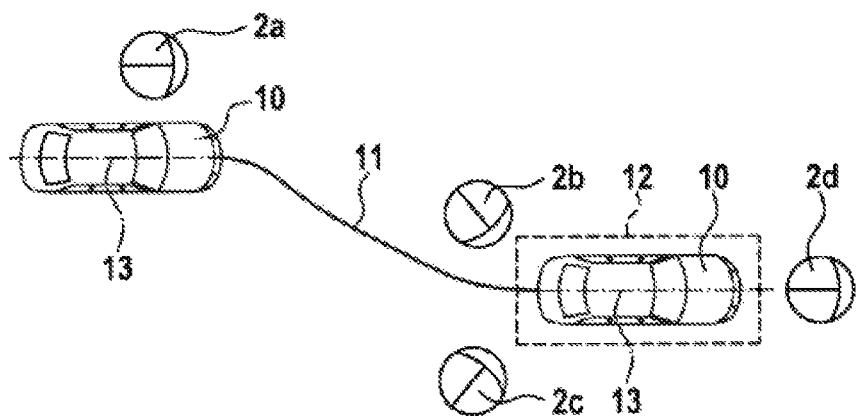
FIG. 2 shows a schematic representation of a parking process with different steering wheel positions.

In FIG. 2 a vehicle 10 is represented during a parking process. The vehicle 10 is fitted with a steering system according to FIG. 1, which comprises an electric servomotor 7, moreover with an automated parking brake that comprises an electric brake motor and by means of which a brake force that holds the vehicle at a standstill can be automatically generated. Both the steering system and also the automated parking brake in the vehicle 10 can be activated by means of signals for the automatic activation of the respective system.

The vehicle 10 should be moved along a trajectory 11 to a parking space 12, for example a parking bay, for parking.

In order to be able to move along the trajectory 11, a certain steering angle profile is necessary that is predetermined by an operation of the steering wheel 2. In FIG. 2, various settings of the steering wheel 2 are represented, starting from the steering wheel position 2a at the start of the parking process of the vehicle 10, in which the steering wheel 2a adopts a neutral position in which the steerable wheels are oriented at least approximately parallel to the longitudinal axis 13 of the vehicle 10. When maneuvering towards the parking space 12 along the trajectory 11, the steering wheel position is changed multiple times, so that different steering wheel positions occur according to the illustrations 2b and 2c, in which the steerable wheels are outside the neutral positions and have a steering angle.

After the vehicle 10 has reached the parked position thereof in the parking space 12, the steering system in the vehicle is automatically activated, so that the steerable wheels adopt a neutral position. This is symbolized using the steering wheel 2d that is also in a neutral position, in which a central spoke of the steering wheel is parallel to the longitudinal axis 13 of the parked vehicle 10, and the steerable wheels of the vehicle are oriented at least approximately parallel to the longitudinal axis 13. The neutral position of the steering system is for example adjusted by means of an analysis of the data of the steering angle sensor.

The automatic adjustment of the steering system to reach the neutral position depends on the ending of the parking process. After the vehicle has reached the position thereof in the parking space 12, the automated parking brake is activated, which is either triggered by a driver operation or by automatic triggering, and thereupon produces a brake force that holds the vehicle at a standstill by means of operation of the electric brake motor. Following the completion of the parking brake process—on reaching a target parking brake force—a signal is automatically generated that is used as the control signal for activation of the electric servomotor in the steering system. Thereupon the neutral position is set in the steering system with an orientation of the steerable wheels at least approximately parallel to the longitudinal axis.

The automatic activation of the steering system to achieve the neutral position may also be triggered by alternative events. Thus it is for example possible to use ignition confirmation in the vehicle for switching off the drive engine, i.e. the change of the ignition position from "on" to "off".

Furthermore, it is also possible to perform the automatic adjustment of the neutral position only before or during a re-start of the vehicle 10, for example during a change of the ignition status from "off" to "on".

What is claimed is:

1. A method for automatically adjusting a steering angle of a steering wheel and steerable wheels in a steering system of a vehicle, the method comprising:
   detecting that the vehicle has been parked;
   determining a steering angle of the steerable wheels;
   after detecting that the vehicle has been parked and before a next drive-off of the vehicle, generating a first signal, depending on the determined steering angle, configured to operate a steering actuator of the steering system to move the steering wheel and the steerable wheels into a neutral position in which the steerable wheels are oriented parallel to a longitudinal axis of the vehicle.

2. The method according to claim 1, the generating the first signal further comprising:
   generating the first signal in response to a manually triggering while the vehicle is parked.

3. The method according to claim 1, the generating the first signal further comprising:
 generating the first signal in response to a second signal indicating that the vehicle is parked.

4. The method according to claim 3, the detecting that the vehicle has been parked further comprising:
 generating the second signal indicating that the vehicle is parked in response to an automated parking brake of the vehicle producing a brake force that holds the vehicle at a standstill.

5. The method according to claim 3, the detecting that the vehicle has been parked further comprising:
 generating the second signal indicating that the vehicle is parked in response to the vehicle being at a standstill and an ignition of the vehicle being set to an "off" position.

6. The method according to claim 1, the generating the first signal further comprising:
 generating the first signal in response to an ignition of the vehicle being changed from an "off" position to an "on" position.

7. The method according to claim 1, the generating the first signal further comprising:
 generating the first signal regardless of a gradient of a road on which the vehicle is located.

8. A regulating or control unit configured to perform the method according to claim 1.

9. A steering system in a vehicle, the steering system comprising:
 a steering actuator configured to adjust a steering angle of a steering wheel and steerable wheels of the vehicle; and
 a controller configured to:
  detect that the vehicle has been parked;
  determine the steering angle of the steerable wheels; and
  after detecting that the vehicle has been parked and before a next drive-off of the vehicle, generate a first signal, depending on the determined steering angle, configured to operate the steering actuator of the steering system to move the steering wheel and the steerable wheels into a neutral position in which the steerable wheels are oriented parallel to a longitudinal axis of the vehicle.

10. A vehicle, comprising:
a steering wheel;
steerable wheels; and
a steering actuator configured to adjust a steering angle of the steering wheel and the steerable wheels of the vehicle; and
a controller configured to:
 detect that the vehicle has been parked;
 determine the steering angle of the steerable wheels; and
 after detecting that the vehicle has been parked and before a next drive-off of the vehicle, generate a first signal, depending on the determined steering angle, configured to operate the steering actuator of the steering system to move the steering wheel and the steerable wheels into a neutral position in which the steerable wheels are oriented parallel to a longitudinal axis of the vehicle.

11. The vehicle according to claim 10, further comprising:
an automated parking brake configured to produce a parking force to hold the vehicle at a standstill.

* * * * *